Jan. 31, 1967     E. A. HEINER     3,301,108

EXPANDING AND CONTRACTING MANDREL

Filed March 24, 1965     2 Sheets-Sheet 1

INVENTOR
EDWARD A. HEINER

Thomas S. Ross

BY     ATTORNEY

INVENTOR
EDWARD A. HEINER

BY Thomas S. Ross

ATTORNEY

United States Patent Office 3,301,108
Patented Jan. 31, 1967

3,301,108
EXPANDING AND CONTRACTING MANDREL
Edward A. Heiner, Rocky Hill, Conn., assignor, by mesne assignments, to Royal Typewriter Company, Inc., New York, N.Y., a corporation of Delaware
Filed Mar. 24, 1965, Ser. No. 442,407
6 Claims. (Cl. 82—44)

This invention relates to an improved expanding and contracting mandrel for use in holding or supporting a work piece of the type having a cylindrical bore.

More particularly the present invention contemplates the provision of a production mandrel in which the holding force or clamping pressure against the work piece is predetermined; is substantially constant; and is not directly under the control of an operator.

The present invention further contemplates the provision of a production mandrel of the above nature that is sturdy; that is structurally simple and inexpensive to manufacture and sell; that enables fast loading and unloading of the work pieces; that is capable of reliable operation over extended periods of time by unexperienced help; and which can be used without danger of distorting or otherwise damaging the work pieces through the clamping force or pressure exerted thereon by the mandrel.

Other objects will be in part apparent and in part pointed out hereinafter.

In the drawings wherein is shown a preferred embodiment of the invention and wherein similar reference numerals and characters refer to similar parts throughout the several views.

Figure 1:
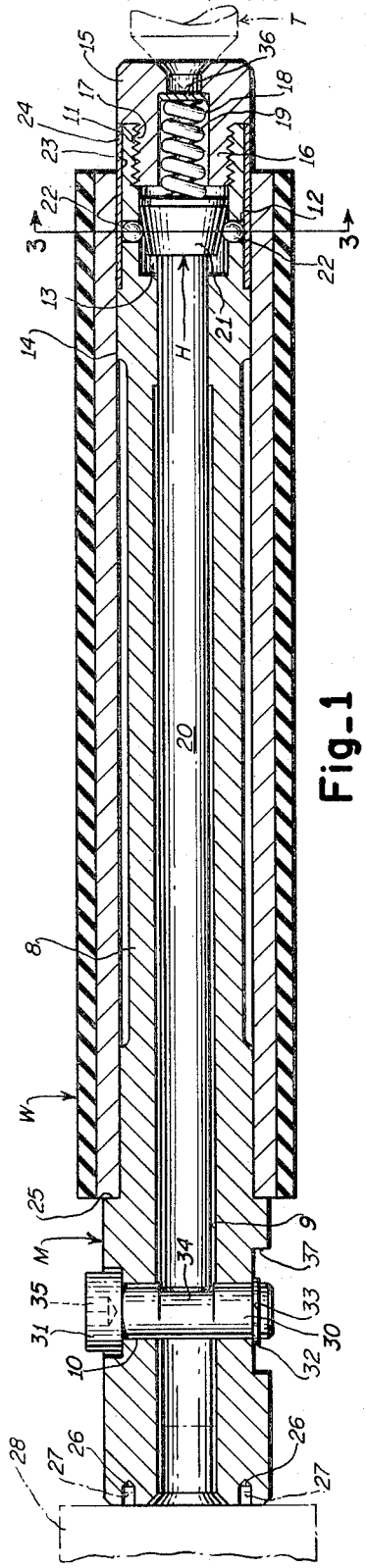
FIGURE 1 is a part elevational and part sectional view of an expanding and contracting mandrel embodying features of the present invention and illustrating the mandrel in expanded or work holding position.
Figure 3:
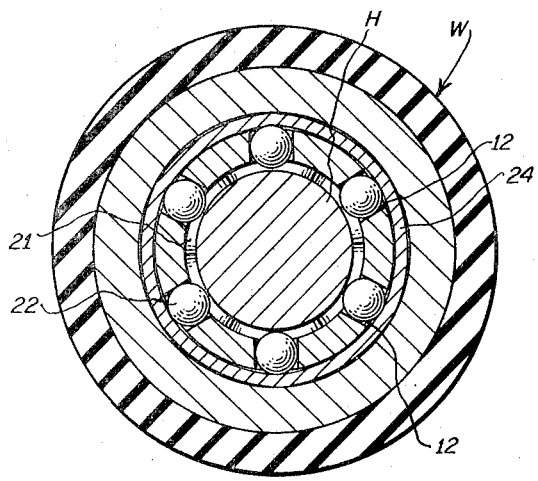
FIGURE 3 is a cross sectional view through the clamping end of the mandrel taken on a plane corresponding to line 3—3 of FIGURE 1 looking in the direction indicated by the arrows.
Figure 6:
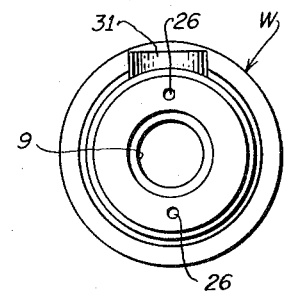
FIGURE 6 is an end elevational view of the left hand end of the mandrel with a work piece mounted thereon.

Referring now to the drawings in detail an expandable and contractable mandrel made in accordance with one embodiment of the present invention is shown and designated generally by reference character M and a work piece having a cylindrical bore is shown in FIGURES 1, 3 and 6 and indicated as a whole by reference character W.

Figure 2:
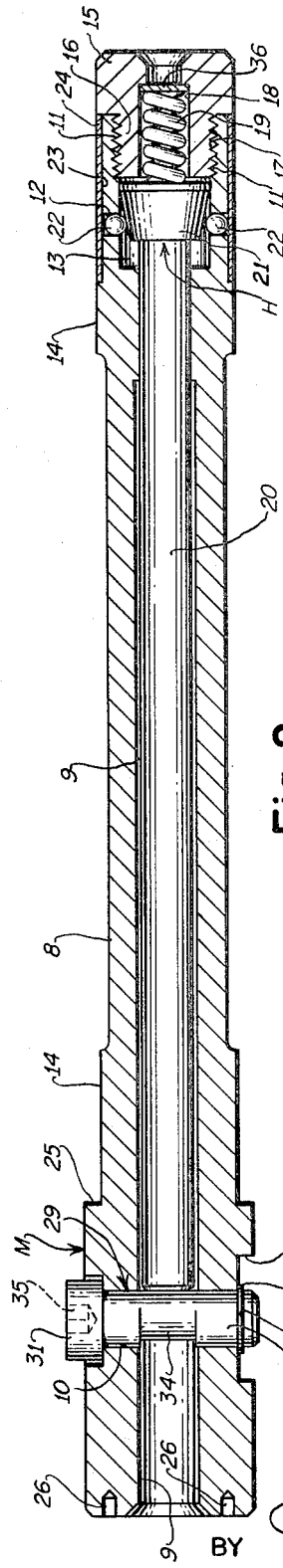
FIGURE 2 is a view similar to FIGURE 1 but with certain parts omitted and showing the mandrel in contracted or work releasing position.

The mandrel M generally comprises an elongated cylindrical body 8 having an axial through bore 9 and an intersecting transverse bore 10. The bore 9 of body 8 is enlarged or counter bored at its right hand end, as viewed in FIGURES 1 and 2, and is provided with an internal thread 11 and a plurality of radially arranged openings or seats 12 which extend through the body 8 from the enlarged part 13 of bore 9 to the outer face or periphery 14 of body 8. The right hand end of bore 9 in body 8 (FIGURE 1) is closed by a removable end cap 15. This end cap has a reduced neck 16 which is externally threaded at 17 to match the internal threads 11 of body 8. The cap 15 is also provided with an axial bore 18 the enlarged part of which receives spring 19 and the reduced and tapered part of which receives the tail stock T of a lathe or similar machine tool used when rotating the mandrel. A dust shield or disc 36 mounted in the enlarged part of bore 18 serves as a seat for one end of said spring 19. Mounted for axial sliding movement within bore 9 of body 8 is a control shaft 20. The right hand end of this shaft, as viewed in FIGURES 1 and 2, terminates in an enlarged head H having a conical wedging surface 21 which cooperates with a plurality of hardened balls 22 disposed in the seats 12 for reasons presently described. The end of head H serves as a seat for the other end of spring 19. The outer face or periphery 14 of body 8 is slightly reduced in diameter as indicated at 23 to telescopically receive a tubular clamping sleeve 24. This sleeve is held upon the body 8 by the aforementioned end cap 15, as clearly shown in FIGURES 1 and 2, and covers the seats 12 and balls 22.

The control or left hand end of mandrel M (FIGURE 1) is of larger diameter than the work piece receiving portion thus providing a shoulder 25 which serves as a limit stop for the work piece W when it is telescopically pushed upon the mandrel. This control end of mandrel M is further provided with a pair of opposed pin sockets or recesses 26 to receive a pair of driving pins 27 of a lathe chuck 28.

Figure 4:
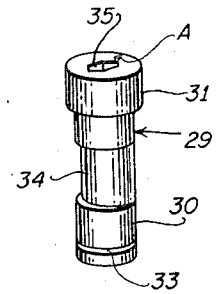
FIGURE 4 is a perspective detail of the manually operated control cam used to initiate clamping and release of the mandrel.
Figure 7:
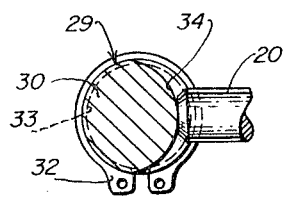
FIGURE 7 is a cross section through the eccentric portion of the control cam shown in FIGURE 4 and the cam driven end of the axially movable control shaft.

The manually operated control cam 29 (FIGURE 4) comprises a stem 30 having a head 31. The stem is rotatably mounted in the aforementioned bore 10 of body 8 and is removably held therein by a snap ring 32 (FIGURE 7) which snaps into a circumferential groove formed in the lower end of said stem, the latter projecting into recess 37 (FIGURE 1) of body 8. The intermediate portion of stem 30 is reduced to form an eccentric 34 and a wrench socket 35 is provided in head 31 to enable an operator to rotate control cam 29 within body 8 when clamping work piece W upon the mandrel, or releasing it for removal therefrom.

In operation mandrel M is loaded by first manually rotating control cam 29 until arrow A on head 31 points towards arrow B on body 8. Thus control cam 29 is in the FIGURE 2 position and the left end of control shaft 20 is held against the eccentric 34 of said cam 29 by spring 19. This position of control shaft 20 removes all outward force or pressure upon balls 22 and in turn against the clamping sleeve 24.

Figure 5:
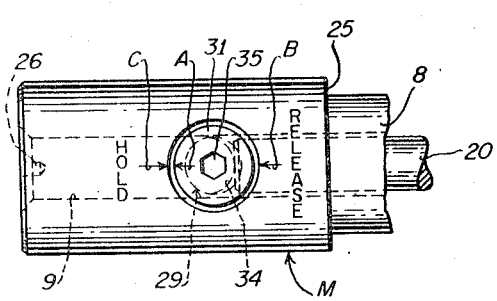
FIGURE 5 is a fragmentary elevational view of the left end of the mandrel as viewed in FIGURE 1.

Having thus conditioned the mandrel to receive a work piece, such work piece may be telescopically slid upon mandrel M until it comes to rest against shoulder 25 of body 8. When in this position the work piece W is then locked or clamped upon the mandrel for rotation therewith by inserting a wrench into socket 35 of control cam 29 and rotating such cam 180 degrees or until the arrow A on the control cam points to arrow C on body 8 as shown in FIGURE 5. This rotation of control cam 29 positions the eccentric 34 so that its low portion is adjacent the left end of control shaft 20. Spring 19 has now shifted or moved said control shaft axially to the left, as viewed in FIGURE 1, and balls 22 have been forced to ride upwardly or radially outward upon the conical wedging surface 21 and against the clamping sleeve 24 to thereby frictionally grip and hold work piece W tightly upon the outer periphery or face 14 of the mandrel.

With the work piece and mandrel thus locked together the mandrel can then be mounted upon a lathe or like machine tool capable of rotating the mandrel while machining or grinding the outer periphery of the work piece.

When the outer periphery of the work piece has been properly ground to the desired diameter the mandrel can be quickly and conveniently removed from the lathe by merely removing the tail stock T and then removing the mandrel from the driving pins 27. It will be obvious that work piece W can be released from clamping sleeve 24 while mandrel M is still in the lathe or after it is removed from the lathe, whichever is most convenient.

Assuming there are six hardened balls 22, the outward radial thrust of such balls have a tendency to change the clamping sleeve 24 from cylindrical shape to a slightly hexagonal shape as best seen in FIGURE 3. In other words, the clamping sleeve will have six friction or pressure points bearing against the bore of work piece W when balls 22 are forced radially outward in the manner above described.

In actual practice it has been found that by using a spring 19 which exerts a twenty pound force against the right hand end of control shaft 20, balls 22 will in turn exert a two hundred pound force against the clamping sleeve 24 thus producing a constant mechanical advantage having a ratio of approximately 10 to 1 and which clamping force upon the work piece is completely out of the operator's control.

The mechanism disclosed embodies the invention in a preferred form but it is intended that the disclosure be illustrative rather than definitive. The invention is defined in the appended claims.

The invention claimed is:

1. In an expanding mandrel for use in supporting a work piece, the combination comprising:
   (a) an elongated body having an axial bore;
   (b) a plurality of openings extending radially outward from said axial bore through said body;
   (c) a ball in each opening;
   (d) a shaft mounted for longitudinal movement within the axial bore in said body, one end of said shaft having a conical wedging surface;
   (e) a clamping sleeve mounted upon said body and covering the outer ends of said openings;
   (f) resilient means for normally moving said shaft in a first direction to force said balls radially outward against said sleeve; and
   (g) manually operated means for moving said shaft in a second direction to remove all outward force of said balls against said clamping sleeve.

2. An expanding mandrel as recited in claim 1 wherein the manually operated means for moving said shaft comprises a control cam rotatably mounted in said body and having an eccentric portion formed intermediate its ends for longitudinally moving said shaft in opposition to said resilient means.

3. In an expanding and contracting mandrel for use in supporting and rotating a cylindrical work piece while the outer periphery of such work piece is being machined, the combination comprising:
   (a) an elongated cylindrical body member having an axial bore extending from end to end thereof;
   (b) a plurality of radially arranged seats extending outwardly through said body from said axial bore;
   (c) a ball in each seat;
   (d) a control shaft slidably mounted for axial movement within said body member;
   (e) a conical wedging surface formed on one end of said control shaft;
   (f) a tubular clamping sleeve telescopically mounted upon said body member;
   (g) spring means normally acting to move said control shaft in a direction to force said balls radially outwardly into expanding engagement with said sleeve; and,
   (h) a manually rotatable cam mounted in said body member acting to move said control shaft in a reverse direction to thereby remove all outward thrust upon said balls against said clamping sleeve.

4. In an expanding and contracting mandrel for use in supporting and rotating a work piece, the combination comprising:
   (a) an elongated cylindrical body having an axial bore extending from end to end thereof;
   (b) a plurality of radially disposed seats extending outwardly from said axial bore through said body;
   (c) a hardened ball in each seat;
   (d) a control shaft mounted for longitudinal sliding movement within the axial bore in said body, one end of said shaft terminating in a frustro conical head;
   (e) a deformable clamping sleeve mounted upon the periphery of said body;
   (f) spring means adapted to exert a predetermined force against one end of said shaft to normally force said balls radially outward within their seats and against said sleeve; and,
   (g) a manually rotatable cam for moving said shaft in a reverse direction and in opposition to said spring to thereby remove all outward force imparted to said balls by said shaft and against said clamping sleeve.

5. In an expanding and contracting mandrel of the type used to rotate a cylindrical work piece while the outer periphery of such work piece is being machined, the combination comprising:
   (a) an elongated cylindrical body member having an axial bore extending from end to end thereof;
   (b) a plurality of radially arranged seats near one end of said body member and extending outwardly through said body from said axial bore;
   (c) a ball in each seat;
   (d) a control shaft slidably mounted for axial movement in a first and second direction within said body member;
   (e) a conical wedging surface formed on one end of said control shaft for forcing said balls radially outward when said shaft is moved in a first direction;
   (f) a thin walled clamping sleeve telescopically mounted upon said body member and serving to retain said balls within their respective seats in said body;
   (g) spring means having a predetermined expansion force acting upon said control shaft to move it in said first direction; and,
   (h) a manually operable cam rotatably mounted in said body member for moving said control shaft in said second direction to thereby remove all outward thrust imparted to said clamping sleeve by said balls.

6. In a work holding mandrel of the class described, the combination comprising:
   (a) an elongated cylindrical body member having an axial bore extending from end to end thereof and a traverse bore intersecting said axial bore;
   (b) a plurality of radially disposed seats in said body;
   (c) a ball in each seat;
   (d) a control shaft slidably mounted for axial movement within said axial bore of said body member;
   (e) spring means normally urging said control shaft in a first direction;
   (f) a tubular work clamping sleeve telescopically mounted upon one end of said body member;
   (g) a conical wedging surface formed at one end of said control shaft acting to force said balls radially outward within their seats and into expanding engagement with the inner periphery of said clamping sleeve when said shaft is moved in said first direction by said spring means; and, (h) manually controlled cam means rotatably mounted within said transverse bore and adapted when rotated to move said control shaft in a second direction to thereby remove all outward thrust of said balls against said clamping sleeve.

No references cited.

WILLIAM W. DYER, JR., *Primary Examiner.*

LEONIDAS VLACHOS, *Examiner.*